2,848,307
PROCESS FOR DETECTING PRESENCE OF BORANES

William H. Hill, Mount Lebanon, Pa., assignor to Callery Chemical Company, Pittsburgh, Pa., a corporation of Pennsylvania No Drawing. Application February 4, 1955
Serial No. 486,266

10 Claims. (Cl. 23—232)

This invention relates to a process for detecting the presence of boranes (boron hydrides) in the atmosphere and more particularly to a process in which a chemical indicator is reduced by a borane to produce a distinct color change.

Various chemical compounds are known which undergo a distinct color change when contacted with certain gases. Thus, o-tolidine can be used to detect chlorine and p-rosaniline hydrochloride will produce a color change when contacted with formaldehyde. In a similar fashion, benzidine acetate is sensitive to hydrocyanic acid. Similar methods have been used to detect the presence of other toxic gases such as hydrogen sulfide, phosgene and carbon monoxide. However, so far as I am aware no method has yet been developed which will rapidly detect the presence of small amounts of toxic volatile boranes in a convenient and practical manner.

It is an object of this invention to provide a new and useful process for detecting the presence of boranes in air mixtures which is rapid and convenient.

Another object is to provide a new and useful process which will detect the presence of microgram quantities of toxic borane compounds based on their reaction with a mixture of a tetrazolium salt and a base in aqueous or non-aqueous solution to produce a distinct and readily visible color change.

Other objects of this invention will be fully described hereinafter and the novelty thereof will be particularly pointed out and distinctly claimed.

This invention is based upon my discovery that the volatile boranes will react with certain tetrazolium salts in an alkaline solution to form highly colored formazans which are insoluble in water but readily soluble in various organic solvents. Thus, this color change can be used to detect small amounts of volatile boranes such as diborane ($B_2H_6$), tetraborane ($B_4H_{10}$), pentaboranes ($B_5H_9$ and $B_5H_{11}$) and decaborane ($B_{10}H_{14}$) in the atmosphere.

When a tetrazolium salt such as 2,3,5-triphenyl-2,1,3,4-tetrazolium chloride is dissolved in an alkaline solution and a borane such as decaborane is added, the free tetrazolium base is reduced to form a deep red insoluble triphenyl formazan as follows:

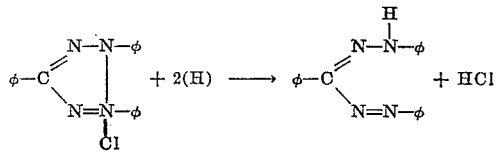

If an aqueous alkaline solution is used to carry out the reaction the formazan is precipitated as a dark red flocculent material. By adding a solvent miscible with water such as dioxane, acetone or an alcohol, a uniform red colored solution is obtained. If a solvent which is not miscible with water such as xylene is added, the formazan dissolves in the solvent to form a deep red solution. Similarly, if the tetrazolium salt was originally dissolved in an organic solvent for the formazan no precipitate is obtained but a colored solution is produced.

The reduction of triphenyltetrazolium chloride by a borane such as decaborane does not occur in neutral or acid solutions. Therefore, it is necessary to add an alkali to the solution. Some alkaline materials which I have found to be satisfactory are sodium hydroxide, potassium hydroxide, ammonia, n-butylamine, tri-n-butylamine, n-amylamine, aniline and many others. It should be noted however that the alkalinity of the organic bases, as expressed by their dissociation constants, varies considerably and that therefore they do not all perform in the same manner. In general, however, the stronger the base used in this method the faster the color development. The solvent or liquid medium in which these bases are used is also important. Color formation between the boranes and tetrazolium compounds occurs most rapidly in polar solvents. In mixtures of polar and non-polar solvents the speed of reaction is reduced.

Other chemical indicators which can be used in this process include blue tetrazolium (3,3[1]-dianisole-bis-4,4[1]-(3,5 - diphenyl) - tetrazolium chloride), neotetrazolium chloride (2,2-(p-diphenylene)bis(3,5 diphenyltetrazolium chloride) and neotetrazolium phosphate. When these materials are reduced by a borane they produce a pronounced color change.

It should be understood that this process is not used as a test for boron but is based upon the ability of boranes to reduce tetrazolium salts to formazans which produce a visible color change. Any other material present which will cause this reduction will likewise produce a change in color. However, if it is known that the atmosphere to be tested is contaminated only with boranes, then it follows that the color change is due only to the presence of the boranes and the process is applicable.

In one embodiment of this invention a 0.01% solution of triphenyltetrazolium chloride in dioxane was prepared. To this was added sufficient aqueous sodium hydroxide until the solution was alkaline to litmus. A solution of decaborane in dioxane was then prepared which contained 10 micrograms of boron per milliliter of solution. When the two solutions were mixed a red color developed within a few minutes. Thus, this process can be used as either a qualitative or quantitative test for borane compounds. The appearance of the red color indicates boranes are present. If this color is matched in a colorimeter with the color obtained from a sample containing a known amount of boranes, a quantitative measurement of the amount of borane present is possible.

In another experiment, triphenyltetrazolium chloride was added to acetone containing enough sodium hydroxide to give an alkaline reaction to litmus. When pentaborane was bubbled through this solution, a deep red color formed almost immediately. The test is very sensitive and will detect the presence of as little as 5 to 10 micrograms of boron per milliliter of solution.

In still another experiment, three gas washing bottles connected in series were each charged with 2 ml. of 0.1% aqueous triphenyltetrazolium chloride solution, 5 ml. of 0.6 N sodium hydroxide solution and 20 ml. of xylene. Air containing 8 parts per million (p. p. m.) of pentaborane-9 was passed through the bottles for 10 minutes at a rate of 0.5 liter per minute. The xylene layer in all the bottles rapidly developed a red color.

In another experiment, 10 ml. of methanol were mixed with 90 ml. of xylene to which solution was added 0.01 g. of triphenyltetrazolium chloride and 0.2 ml. of tri-n-butylamine. Of this reageant 5 ml. were mixed with 5 ml. of xylene which served as a blank and another 5 ml. were mixed with 5 ml. of a solution of decaborane in xylene containing 100 micrograms of decaborane per ml. of solution. The blank remained colorless but the mixture of decaborane and reagent turned red in color immediately upon mixing.

In still another experiment, 100 ml. of 95% ethanol were mixed with 2 ml. of a 1% aqueous solution of triphenyltetrazolium chloride and 2 ml. of 0.6 N sodium hydroxide solution. About 25 ml. of this reagent solution was charged to each of three gas washing bottles which were connected in series. Air containing 3.3 p. p. m. of pentaborane-9 was passed through the bottles for 15 minutes at the rate of 0.5 liter per minute. The solution in the first bottle turned pink in color but the following two bottles remained colorless.

Similar experiments have confirmed the fact that diborane or tetraborane will also produce a red color when reacted in the presence of an alkaline solution of triphenyltetrazolium chloride. In a similar fashion air contaminated with diborane or tetraborane can be bubbled through an aqueous alkaline solution of a tetrazolium salt and the presence of the borane detected by the color change produced. These tetrazolium solutions may also be used in various air testing devices in which the indicator solution is carried on a filter paper or granular carrier through which air is drawn. In such a testing device the presence of a borane is indicated by the color change and the concentration of the borane may be indicated by the intensity of the color change or the length of the stain developed where the indicator is carried on a granular carrier.

Having thus described the invention fully and completely as required by the patent statutes, it should be understood that within the scope of the appended claims, this invention may be practiced otherwise than as specifically illustrated and described.

What I claim and desire to secure by United States Patent is:

1. A process for detecting the presence of boranes which comprises contacting air contaminated with a volatile borane in an amount less than can be detected by smell with a tetrazolium salt in an alkaline solution to produce a distinct color change.

2. A process according to claim 1 in which air contaminated with a volatile borane is bubbled through an alkaline solution containing a tetrazolium salt.

3. A process according to claim 1 in which air contaminated with a volatile borane is passed through a porous inert carrier impregnated with an alkaline solution containing a tetrazolium salt.

4. A process for detecting the presence of boranes which comprises contacting air contaminated with a volatile borane in an amount less than can be detected by smell with a tetrazolium salt in an aqueous alkaline solution to produce a distinct color change.

5. A process according to claim 4 in which the tetrazolium salt is selected from the class consisting of triphenyltetrazolium chloride, blue tetrazolium, neotetrazolium chloride and neotetrazolium phosphate.

6. A process according to claim 4 in which a water immiscible solvent is added to transfer the color produced to said water immiscible solvent.

7. A process according to claim 6 in which the water immiscible solvent is xylene.

8. A process according to claim 4 in which air contaminated with a volatile borane is bubbled through an aqueous alkaline solution containing a tetrazolium salt.

9. A process according to claim 4 in which a solvent miscible with water is added to dissolve the insoluble formazan formed and produce a single phase colored solution.

10. A process according to claim 9 in which the water miscible solvent is dioxane.

References Cited in the file of this patent

Chen: The Jour. of Lab. and Clin. Med., vol. 42, No. 5 (November 1953), pages 749–757.

Weiner: The Chemist Analyst, vol. 37, No. 3 (September 1948), pages 56, 57, 59.

Hurd, D. T.: "Chemistry of the Hydrides" (1952), John Wiley & Sons, New York, page 84.